INVENTOR.
BY MAURICE W. HORRELL
Byard G. Nilsson
ATTORNEY

Dec. 21, 1965 M. W. HORRELL 3,225,183

DATA STORAGE SYSTEM

Filed July 22, 1955 2 Sheets-Sheet 2

INVENTOR.

BY MAURICE W. HORRELL

Byard G. Nilsson

ATTORNEY

United States Patent Office 3,225,183

Patented Dec. 21, 1965

3,225,183

DATA STORAGE SYSTEM

Maurice W. Horrell, Playa Del Rey, Calif., assignor to The Bendix Corporation, a corporation of Delaware Filed July 22, 1955, Ser. No. 523,883
18 Claims. (Cl. 235—167)

This invention relates to data storage systems, and more particularly to a data storage system for registering data in the form of electrical impulses.

Present computing systems often require data storage systems which utilize various types of memory devices for holding or registering data. Data held in such memory devices may be repeatedly scanned by translating devices in such a way as to enable reading and varying the content of the memory device. Certain memory devices utilize magnetic recording material to actually register data. In one arrangement the magnetic recording material is placed around the periphery of a drum which is rotated under magnetic reading and writing heads, i.e., translating devices, thereby causing the drum to be scanned by the sensing and recording devices.

Generally data storage systemss are so organized as to store data in groups of digit positions called words. The memory device of a data storage system may thus consist of many word storing positions, each adapted to store one word.

In order to increase the speed of computation of a computer having a data storage system, it is desirable that the data storage system be so organized as to enable data to be taken from the memory device, combined with other data, and rerecorded in the memory device all during a single scanning by the translating devices. Systems have been devised wherein the content of various word positions in the memory device may be altered immediately after being read; however, such systems have generally operated as volatile data storage systems. In a volatile data storage system, the content of the memory device is altered with each scanning by the sensing and recording means. That is, the various word positions are continually being relocated in the memory device.

In its more general form, the present invention contemplates a data storage system in which a memory device is scanned by sensing and recording devices. A sensing device reads data from the memory device, and a recording device places data into the memory device. Data read from the memory device may then be processed through a system, as a computing system, which requires a predetermined time interval. The scanning of the memory device is then so arranged that the interval between sensing and recording will be such as to coincide with the predetermined interval of time during which the above mentioned computing system handles data. A switching system may then be provided for rendering operative any one of a number of sensing and recording devices operating in conjunction with the storage device.

An object of this invention is to provide an improved data storage system.

Another object of this invention is to provide a data storage system having an improved mode of operation utlizing a non-volatile storage device.

A still further object of this invention is to provide a data storage system operating in such a manner that data registered therein may be rapidly altered in a desired manner.

Other and incidental objects of this invention will be apparent to those skilled in the art from reading the following specification and on inspection of the accompanying drawings in which.

Figures 1, 2:
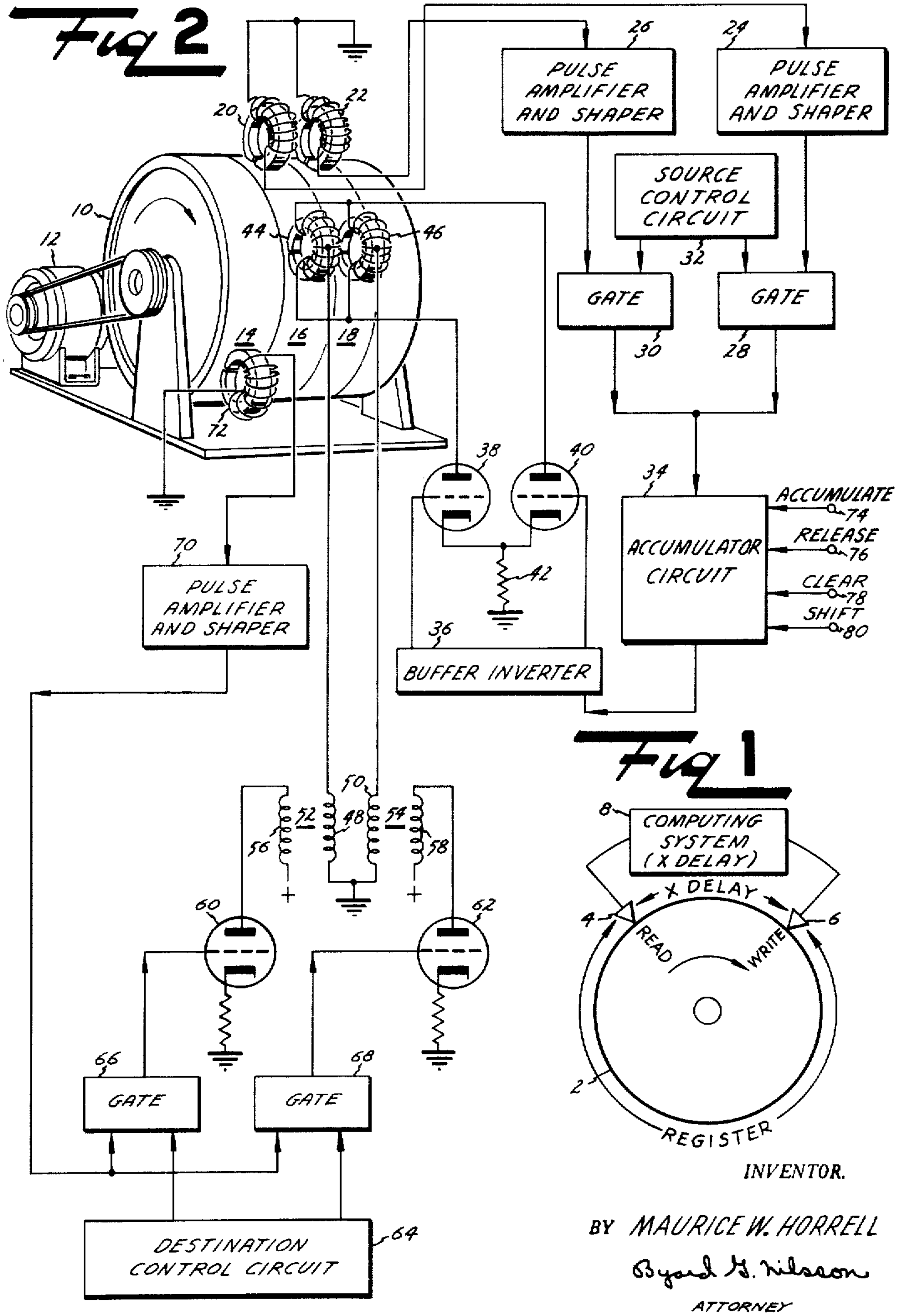
FIGURE 1 shows a manner of data flow in a system of the invention.
FIGURE 2 shows a circuit and block diagrammatic representation of a form of the invention.

Referring now more specifically to FIGURE 1, there is shown a circle which is representative of a recording track 2 on the periphery of a magnetic drum. Positioned adjacent to the recording track 2 are magnetic reading and writing heads 4 and 6 respectively. Connected between the magnetic reading and writing heads 4 and 6 is a computing system 8. The computing system 8 is so designed as to inherently require a predetermined period of time to operate upon numerical data, say for example, one word time. This predetermined period of time is labelled as X delay period.

Data which is recorded upon the recording track 2 by the recording head 6 passes around the periphery of the drum and is read by the reading head 4. For purposes of explanation of FIGURE 1, the drum containing the track 2 will be assumed to be revolving at a constant speed. With the drum containing the track 2 revolving at a constant speed the time required for the drum to move through a predetermined angle between the heads 6 and 4 will be a constant unvarying time interval. This unvarying time interval is utilized to register the data in storage.

The heads 4 and 6 are also so positioned with respect to the recording track 2 such that a predetermined period of time delay will be required for data passing under the reading head 4 to reach the recording head 6. This period will be made such as to coincide with the above mentioned X delay period required for the computing system 8 to process data.

The recording head 6 is so designed as to be capable of writing fresh data over formerly recorded data without first erasing the formerly recorded data. That is, the magnetic recording head 6 is capable of changing stored representations of 1 to stored representations of 0, and changing stored representations of 0 to stored representations of 1. In the event that the data read by the reading head 4 is to be used in the computing system 8 and is also to be preserved in storage, then such data recorded in the track 2 will remain recorded upon the track, and will not be altered by the writing head 6.

However, if it is desired to alter the content of a particular word position on the recording track 2, such a word position may be altered without requiring an additional revolution of the recording track 2 to effect another scanning operation.

Assume that a word of data located on a particular word position of the reading track 2 is read by the magnetic reading head 4. If this word is desired to be preserved upon the track 2, the recording head 6 will not alter the word content during the interval that the word position containing this word of data is scanned by the recording head 6. Assume now that a word of data read from the recording track 2 by the reading head 4 is to be combined with data contained in the computing system 8 and then returned to the same word position on the recording track from which it was read. In this event, the recording head 6 will receive the new data as it scans the word position from which the word of data was taken, and the new data will be registered in this desired word position.

It may therefore be seen that information may be read from a particular word position of the memory, altered, and placed back in the same word position during one scanning cycle. This method of operation allows increased speed of operation of a system utilizing the data storage system. It shall also be noted that in view of the non-volatility of the storage system, there is less possibility for error, in that during every scanning cycle, the data is not recorded fresh upon the storage device. Another advantage of the non-volatile storage system is that in the event of a power failure, the data recorded upon the memory device remains recorded.

Referring now to FIGURE 2, there is shown a magnetic drum 10 having a magnetic material, as iron oxide, coated upon its periphery. The magnetic drum 10 is adapted to be rotated in a clockwise fashion by a motor 12 which is mechanically coupled to the magnetic drum 10. The periphery of the magnetic drum 10 is divided lengthwise into a plurality of recording tracks, including tracks 14, 16, and 18. Positioned in contiguous relationship to the magnetic drum 10 in tracks 16 and 18 respectively are magnetic reading heads 20 and 22. The magnetic reading head 20 is connected between a point of reference potential and a pulse amplifier and shaper system 24. The magnetic reading head 22 is coupled between a point of reference potential, and a pulse amplifier and shaper system 26.

The pulse amplifier and shaper systems 24 and 26 may be any of a number of well-known systems for deriving a useable pulse from an impulse recorded upon a magnetic medium. The outputs from the pulse amplifier and shaper systems 24 and 26 are coupled respectively to gate circuits 28 and 30. The gate circuits 28 and 30 are the well-known coincidence type gate circuits which require a number of input signals to be at a relatively high value to allow the passage of a high signal.

The gate circuits 28 and 30 are individually coupled to a source control circuit 32. The source control circuit 32 comprises a system which will generate one particular signal at a relatively high value during a period when it is desired to take data from a particular position on a particular track of the magnetic drum 10. A source control circuit which may be utilized to perform the function of the source control circuit 32 is shown and described in a copending patent application of Robert M. Beck et al., Serial No. 509,271, filed May 18, 1955, having a common inventor and assignee as the present application.

The output leads from the gate circuits 28 and 30 are coupled to an accumulator circuit 34. A diagrammatic representation of an accumulator circuit which may be utilized as the accumulator 34 will later be described in detail; however, in general, the function of the accumulator circuit 34 is to receive numerical data, and in accordance with signal instructions either to sum or to accumulate such numerical data received, clear numerical data formerly received, or release numerical data received.

The output of the accumulator circuit 34 is coupled to a buffer-inverter circuit 36. The buffer-inverter circuit will be later described in detail; however, generally it functions to produce two output signals each of which is capable of having two levels of magnitude, and which always have different levels of magnitude. The state of the input signal to the buffer-inverter circuit 36 controls which of the two output signals will be high and which of the two outputs will be low.

The two output signals from the buffer inverter 36 are coupled to electron discharge devices 38 and 40. The cathodes of the vacuum tubes 38 and 40 are coupled through a resistance element 42 to a point of reference potential. The plate of the vacuum tube 38 is coupled to one terminal of each of magnetic recording heads 44 and 46. The plate of the vacuum tube 40 is coupled to the other terminals of the windings of the magnetic recording heads 44 and 46. The windings of the magnetic recording heads 44 and 46 have center taps which are respectively coupled to transformer windings 48 and 50 of transformers 52 and 54. Windings 56 and 58 of the transformers 52 and 54 are connected between a source of positive potential, and plates of vacuum tubes 60 and 62 respectively. Cathodes of the vacuum tubes 60 and 62 are connected to sources of reference potential through biasing impedances.

A destination control circuit 64, shown in FIGURE 2, is utilized for controlling which of the tracks of the magnetic drum 10 data shall be recorded upon, during a particular interval of time. The destination control circuit 64 has a plurality of two-state signal outputs and one of these outputs will be high during a time interval to indicate a particular track of the magnetic drum 10 shall be recorded upon during such a time interval. A destination control circuit which may be used to perform the operation of the destination control circuit 64 is shown and described in the above referenced patent application of Robert M. Beck et al.

The destination control circuit 64 has individual outputs coupled to gate circuits 66 and 68. The gate circuits 66 and 68 are respectively coupled to grids of the vacuum tubes 60 and 62. It may therefore be seen that depending upon which of the gate circuits 66 or 68 becomes qualified and passes a relatively high signal, one of the vacuum tubes 60 or 62 will be rendered conductive.

The gate circuits 66 and 68 have a common connection to a pulse amplifier and shaper circuit 70 which receives signals from a reading head 72 positioned adjacent to the recording track 14 of the magnetic drum register 10. The recording track 14 of the magnetic drum register 10 is utilized as a clock track to produce synchronizing signals, and therefore contains regularly recorded impulses which may be used to synchronize the operation of the system with the speed of rotation of the drum 10.

The accumulator circuit 34 serves to illustrate a computing system which may be utilized in operative conjunction with the system. This one-word accumulator circuit 34 acts on signal to perform any of a number of functions. The accumulator circuit consists of an adder circuit acting in conjunction with a one-word register device. The register device of the accumulator may be used to hold numerical data which can be additively combined with other numerical data by the adder circuit of the accumulator, and placed back in the register device of the accumulator circuit. This function of accumulation, i.e., summing received data, will be performed by the accumulator circuit 34 at a time when a two-state signal, i.e., a signal having two levels of magnitude, applied at the terminal 74 is high. In the event it is desired to release the accumulated data from the accumulator circuit 34, a two-state signal applied at the terminal 76 must be high. The occurrence of a high value for a two-state signal applied at the terminal 78 will cause the accumulator circuit 34 to be cleared of its previous data content. To cause numerical data to be advanced with respect to its former position upon the magnetic drum 10, a high value of a two-state signal will be applied at the terminal 80 to cause the accumulator to release information at an advanced time.

It is to be understood that various other types of computing systems having a predetermined delay period inherent in operation other than an accumulator circuit, may be utilized in conjunction with the system of this invention, and that various delay periods may be used.

In the operation of the system shown in FIGURE 2, assume first that it is desired to read data from a particular word position of the track 16. During an interval when the word position on the drum 10 desired to be read is being scanned by the read head 20, the gate circuit 28 will receive a high signal from the source control circuit 32. This high signal will allow electrical impulses sensed by the reading head 20 and amplified and shaped by the pulse amplifier and shaper 24 to pass through the gate circuit 28 to the accumulator circuit 34.

Similarly, data may be read from a word position on the track 18 by causing the gate circuit 30 to be qualified by a high signal from the source control circuit 32 during the interval when the word position is being scanned by the reading head 22.

The detailed operation of the accumulator circuit 34 will be later described; however, assume now that it is desired to release certain numerical data from the accumulator circuit 34 and record such numerical data in a particular word position on the track 16 of the magnetic drum register 10. During such an operation, as previously stated, a relatively high signal must be applied at the terminal 76, to cause the accumulator circuit 34 to release its numerical contents. The numerical data leaving the accumulator circuit is applied to the buffer inverter circuit 36 to determine which of the vacuum tubes 38 or 40 will be rendered conductive, and thereby indicate either a zero or a one data bit.

When a one bit is applied to the buffer inverter circuit 36, as represented by a pulse of relatively high voltage, the vacuum tube 40 will be rendered conductive. When the vacuum tube 40 is rendered conductive it is possible to set up a magnetic field within the magnetic recording head 44 in one direction by application of a voltage at the center tap of the winding on the magnetic recording heads. When a zero bit is received at the buffer inverter circuit 36, represented by a relatively low voltage, then the vacuum tube 38 will be rendered conductive to allow a magnetic field to be set up in the recording heads 44 and 46 in a direction opposite to that described above which occurs when the vacuum tube 40 is rendered conductive.

If the flux is set up in one of the magnetic recording heads 44 or 46 in a certain direction, elemental recording areas on the magnetic drum 10 will be caused to become magnetized in such a manner as to indicate one bits. If the flux is one of the heads 44 or 46 is set up in an opposite direction, the elemental recording areas of the magnetic drum 10 will be magnetized in a reverse direction to indicate zero bits of data.

The actual setting up of a magnetic field in the recording heads 44 and 46 requires the operation of the destination control circuit 64, which will indicate which of the magnetic recording heads 44 or 46 shall receive a current and perform the recording operation.

Assuming that it is desired to record numerical information on the track 16 of the magnetic drum 10, a high signal will be applied from the destination control circuit 64 to the gate circuit 66. The gate circuit 66 will also receive electrical pulses from the pulse amplifier and shaper 70. The pulses from the pulse amplifier and shaper 70 indicate each digit position of the magnetic drum register 10. The gate circuit 66 is thus qualified during each of the digit positions of a word position on the drum 10, thereby allowing the vacuum tube 60 to conduct during periodic intervals which are indicative of bit positions on the magnetic drum 10. The conduction of the vacuum tube 60 causes a positive voltage to be applied at the center tap connection of the winding of the recording head 44 by means of the transformer 52.

Upon application of a positive voltage applied to the center tap of the winding of a particular one of the magnetic recording heads 44 or 46, the determination of the direction in which the head will be energized will depend upon which end of the winding of the magnetic recording head is connected to reference potential. This connection to reference potential is provided and determined by the vacuum tubes 38 and 40 as previously explained. It may therefore be seen that the buffer-inverter circuit 36, operating in conjunction with the vacuum tubes 38 and 40, control whether a zero bit or a one bit will be recorded on elemental areas of the magnetic drum register 10 by determining in which direction magnetic flux may be set up in the recording heads 44 and 46. The destination control circuit 64, acting in conjunction with the gate circuits 66 and 68, then controls upon which particular recording track of the magnetic drum register 10 numerical data shall be recorded, by supplying an energizing voltage at the center tap of the winding of a magnetic recording head which is positioned to record upon the recording track wherein information is desired to be recorded.

Recordation of numerical data on the track 18 is accomplished similar to recording on the track 16, at a time when the gate circuit 68 is qualified by a relatively high signal from the destination control circuit 64.

Figures 3, 4:
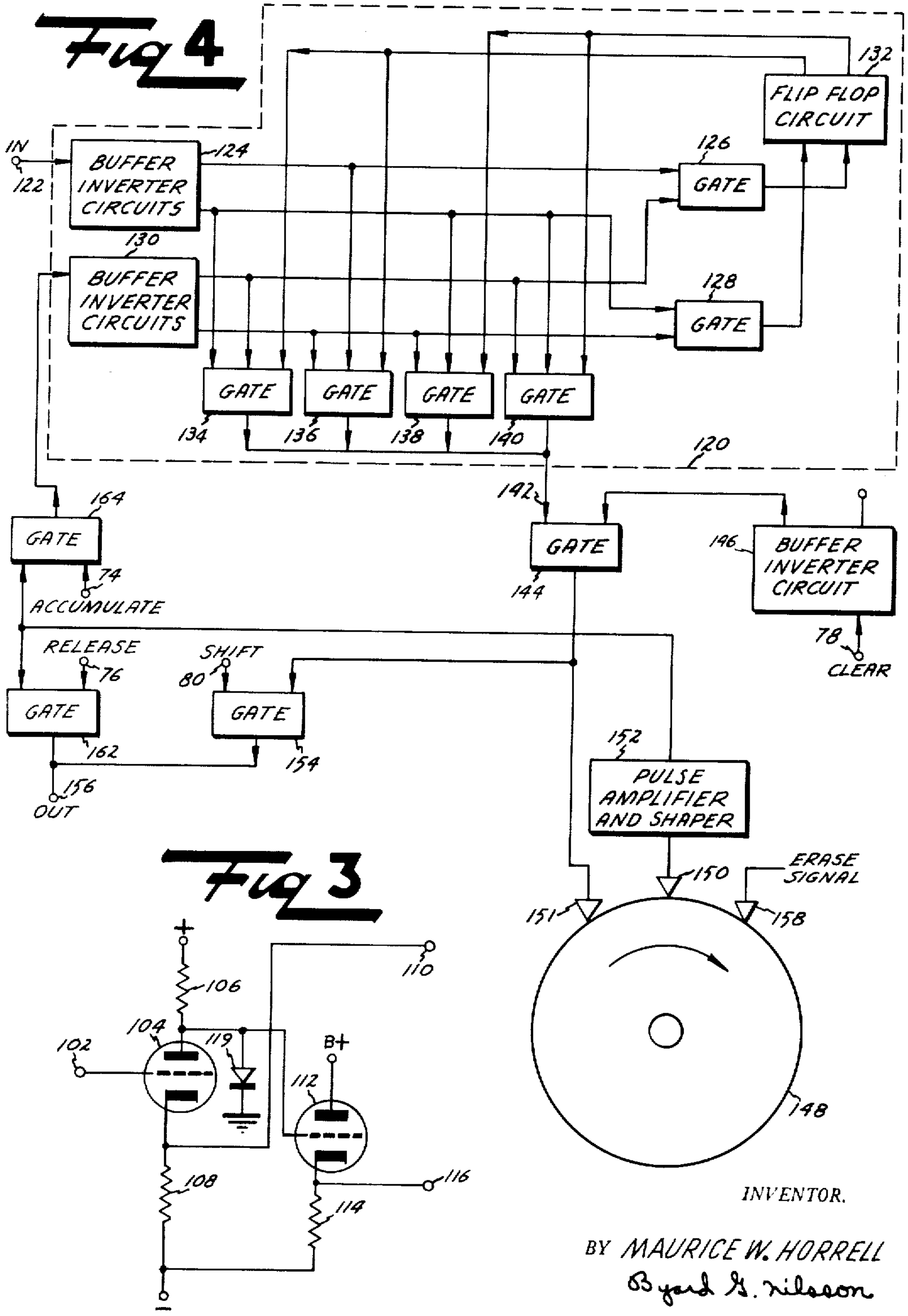
FIGURE 3 shows a circuit diagrammatic representation of a buffer inverter circuit which may be used in the systems of FIGURES 2 and 3.
FIGURE 4 shows a block diagrammatic representation of an accumulator circuit which may be utilized as the accumulator circuit shown in FIGURE 2.

Referring now to FIGURE 3, there is shown a diagrammatic representation of a buffer-inverter circuit. As previously stated, the function of the buffer-inverter circuit is to receive a two-state input signal and to form therefrom two two-state signals, one of which coincides to the input signal and one of which is an inverted form of the input signal.

There is shown in FIGURE 3 an input terminal 102 which is connected to the grid of a vacuum tube 104. The plate of the vacuum tube 104 is connected through a resistance 106 to a source of positive potential. The cathode of the vacuum tube 104 is connected through a resistance 108 to a source of negative potential. A terminal 110 is connected to the cathode of the vacuum tube 104 and provides one output terminal of the buffer-inverter circuit at which a signal coinciding to that at the input terminal appears. The operation of the vacuum tube 104 to form the desired signal at the terminal 110 is in accordance with the well-known cathode-follower type operation.

The plate of the vacuum tube 104 is coupled to the grid of a vacuum tube 112. The plate of the vacuum tube 112 is coupled to a source of positive potential. The cathode of the vacuum tube 112 is coupled through a resistance element 114 to a source of negative potential, and to an output terminal 116. The plate of the vacuum tube 104 is connected through a clamping diode 119 to a source of reference potential.

Upon receiving a signal from the plate of the vacuum tube 104, which will be an inverted form of the input signal, the grid of the vacuum tube 112 will cause the cathode voltage of the tube 112 to fluctuate in a manner similar to the grid voltage. The voltage appearing at the cathode of the vacuum tube 112 and the terminal 116 is thus inverted in form from the input voltage applied at the terminal 102.

Clamping diodes to predetermined voltages may be connected to the output terminals 110 or 116 to maintain the output signals above or below certain limits.

Referring now to FIGURE 4, there is shown an accumulator circuit which may be utilized as the accumulator circuit 34 of FIGURE 2. There is shown in FIGURE 4 a binary adder circuit 120. The adder circuit 120 is of the type wherein first and second streams of electrical pulses representing binary numerical data are combined to form a third stream of electrical pulses representing other binary numerical data, the third stream of electrical pulses being representative of the summation of the numerical information represented by the first two streams of electrical pulses.

A basic knowledge of the addition of binary numbers as represented by electrical pulses will be required to effect an understanding of the operation of the binary adder circuit shown in FIGURE 4. A description of the manipulation of binary numbers appears in Electronics magazine, March 1953, beginning on page 150, in an article entitled, "Arithmetic Processes for Digital Computation."

A first stream of electrical pulses is applied at the terminal 122 which is connected to a buffer-inverter circuit 124. The two outputs from the buffer-inverter circuit 124 are connected to a gate circuit 126, and to a gate circuit 128. A buffer-inverter circuit 130 receives the second stream of input electrical pulses to be additively combined. The buffer-inverter circuit 130 also has its outputs connected to the gate circuits 126 and 128. The outputs from the gate circuits 126 and 128 are applied to a flip-flop circuit 132. The flip-flop circuit 132 may be any of a number of well-known bi-stable devices, wherein when a high signal is applied to one terminal in pulse form, a high signal will appear from a corresponding output terminal for an indefinite period of time. The state of the flip-flop circuit of course may be altered by application of a pulse signal at a terminal opposite from that which would cause the flip-flop circuit to be in its present state.

Upon the occurrence of a one-indicating signal from both of the buffer-inverter circuits 124 and 130, the flip-flop circuit 132 will be set thereby indicating a carry digit is to be placed in the next bit position. The absence of a one-indicating signal from both of the buffer-inverter circuits 124 and 130 will reset the flip-flop circuit 132. Connections are made from the buffer-inverter circuit 124, the buffer-inverter circuit 130 and the flip-flop circuit 132 to gate circuits 134, 136, 138, and 140.

In the process of adding two binary numbers after the first digit position, there are three possible sources of one bits during every digit position, e.g., digits in the individual digit positions of each of the numbers being added, and carry digits from the past digit positions. In the adder circuit 120, the two binary numbers being combined control the states of the buffer-inverter circuits 124 and 130, and carry digits are registered in the flip-flop circuit 132. The occurrence of a single one bit from any of these sources will cause one of the gate circuits 134, 136, 138, or 140, to pass a high one-indicating signal to an output line 142. The occurrence of two one bits from any of the sources will cause all the gate circuits 134, 136, 138, and 140, to be inhibited but will cause the flip-flop circuit 132 to be set to indicate a carry digit into the next digit position. The occurrence of three one bits, i.e. a one bit, from each of the sources, will cause the flip-flop circuit 132 to be set to indicate a carry digit into the next digit position, and will also qualify one of the gate circuits 134, 136, 138, or 140, to pass a one-indicating high signal. In this manner the individual digits of a binary sum will appear on the line 142.

The output from the adder circuit 120 on the line 142 is applied to a gate circuit 144 which during normal operation will be qualified. The gate circuit 144 is normally qualified by a high two-state signal which is an inverted form of the signal applied to the terminal 78.

The buffer inverter circuit 146 receives a high two-state signal at the terminal 78 to clear the content of the accumulator. At a time when such a high signal is applied to the terminal 78, the gate circuit 144 will be inhibited and as numerical data cannot pass, the contents of the accumulator will be reduced to zero by an erase head 158.

The numerical data from the adder circuit 120 after passing through the gate circuit 144 is recorded upon a recording track 148 by a recording head 151. The track 148 may be a track on the drum 10 as shown in FIGURE 2. Positioned in contiguous relationship to the track 148 and spaced one word from the recording head 151, is a reading head 150. The gate circuit 144 is also coupled to a gate circuit 154. The gate circuit 154 is qualified by the occurrence of a high signal at the terminal 80 thereby allowing numerical information to pass through the gate circuit 154 to an output terminal 156 with no delay in the accumulator to thereby shift the position of such numerical information with respect to the drum 10 of FIGURE 2 in an advancing manner.

The accumulator circuit of FIGURE 4 thus has facilities for releasing data with no period of delay.

If data is released after one word position delay the data will be returned to the position on the drum from which it was taken via the read head 150, the pulse amplifier and shaper circuit 152, and the gate circuit 162.

The gate circuit 162 is qualified at a time when a high two-state signal is applied at the terminal 76. With the qualification of the gate circuit 162, a signal will be applied to the output terminal 156 from the accumulator.

The output from the pulse amplifier and shaper circuit 152 is also coupled to a gate circuit 164. The gate circuit 164 is qualified by the application of a high two-stage signal at a terminal 74 to cause information being read from the track 148 to pass through the gate circuit 164 to the buffer inverter circuit 130 and be additively combined with numerical information entering the accumulator circuit at the terminal 122.

In the operation of the accumulator circuit, the magnetic reading and writing heads 150 and 151 are positioned with respect to the track 148 such that the distance between the recording head 151 and the reading head 150 comprises one-word position delay. In the event that it is desired to shift the position of numerical data upon the magnetic drum register 10 in an advancing manner, the delay in the accumulating circuit 34 will be removed. During this time, the gate circuit 154 of FIGURE 4 will be qualified, allowing the data to be taken directly from the gate circuit 144 with no delay.

In the event that it is desired to accumulate numerical data registered on the track 148 by adding it to numerical data about to be scanned from a magnetic drum register, the gate circuit 164 will be qualified and the numerical data read by the reading head 150 will be passed through the pulse amplifier and shaper 152 and the gate circuit 164 to be additively combined in the adder circuit 120 with new numerical data received at the terminal 122.

At a time when the numerical data accumulated in the accumulator circuit is desired to be read out, a high signal will be applied at the terminal 76 to qualify the gate circuit 162 thereby allowing numerical data read from the track 148 by the head 150 to pass through the pulse amplifier and shaper circuit 152, and from gate circuit 162 to the output terminal 156 of the accumulator circuit.

To erase numerical data registered in the accumulator circuit, a high signal is applied at the terminal 78 which causes a low signal to be applied to the gate circuit 144 from the buffer-inverter circuit 146. This low signal will inhibit the gate circuit 144 in such a manner that data may not pass to the recording head 151 to be recorded in the track 148 and the track will remain cleared.

From the above, it may be seen that applicant has shown and described a data storage system having the advantages of non-volatibility and at the same time allowing for alteration of numerical data registered in a storage device with a single scanning cycle of reading and writing scanning devices.

What is claimed is:

1. A data storage system comprising: a cyclic register device; said register device being such as to have a plurality of data storage positions; sensing means controlled to sequentially consider the content of said data storage positions; altering means controlled to sequentially consider the content of said data storage positions; said sensing means and said altering means being such as to consider certain of said storage positions at different instants of time, said different instants of time being separated by a predetermined time interval, data changing means for changing data in a predetermined fashion to form changed data, said data changing means requiring a time interval equivalent to said predetermined time interval to effect a change in data; means for connecting said data changing means to receive data from said sensing means, and to transfer changed data to said altering means.

2. A device according to claim 1 wherein said register device comprises a magnetic drum register.

3. A device according to claim 1 wherein said altering means comprises a computing system for altering data in certain predetermined arithmetic fashions.

4. A magnetic data storage system comprising: a magnetic drum register having a plurality of recording tracks; means for rotating said magnetic drum register; a plurality of magnetic recording heads positioned contiguous to certain of said recording tracks; a plurality of magnetic reading heads positioned contiguous to said certain of said recording tracks; in certain of said tracks, a recording head being displaced from a reading head such that incremental areas on said magnetic drum register will pass under a recording head a predetermined time interval after passing under a reading head; a data processing device requiring an interval to process data which coincides to said predetermined time interval; first switching means for selectively coupling certain of said magnetic reading heads to said data processing device during certain intervals; second switching means for selectively coupling an output from said data processing device to certain of said magnetic recording heads during certain intervals; and third switching means for connecting certain of said plurality of reading heads to certain of said plurality of recording heads during certain intervals.

5. A device according to claim 4 wherein said data processing device comprises a one-word accumulator circuit.

6. In a data processor having processing means for processing data represented by signals, apparatus comprising a cyclic memory having a plurality of positions for storing data, a reader to render the data in each of said positions sequentially available for transfer once every cycle, storage means having a plurality of positions for storing data, the number of positions of said storage means being less than the number of positions of said cyclic memory, means including said storage means for transferring data between the processing means and said cyclic memory, data being transferred from a position in said cyclic memory, being processed by the processing means and the processed data being temporarily retained in said storage means, and a recorder connected to said storage means to record the processed data in the same position of said cyclic memory from which data was read and in less than one cycle of said cyclic memory.

7. In a data processor having processing means for processing data represented by signals, apparatus comprising a cyclic memory having a reading and a recording unit, said cyclic memory having a plurality of positions for storing data, the data in each of said positions being made sequentially available by said reading unit for transfer once every cycle, delay means having a plurality of positions for storing data, the number of positions of said delay means being less than the number of positions of said cyclic memory, and means for transferring data between said cyclic memory and the processing means via said delay means, the data being read from a position in said cyclic memory, processed by the processing means and temporarily retained in said delay means, and means connecting said delay means to said recording unit whereby data is returned to the same position in said cyclic memory in less than one cycle of said cyclic memory.

8. In a data processor having processing means for processing data represented by signals, apparatus comprising a rotatable magnetic drum, a reading head, and a recording head, said rotatable magnetic drum having a plurality of positions for storing data, the data in each of said positions being sequentially available for transfer from said reading head once every cycle, storage means having a plurality of positions for storing data, the number of data storage positions of said storage means being less than the number of positions of said rotatable magnetic drum, and means for transferring data from said reading head of said rotatable magnetic drum to said processing means and via said storage means to said recording head, the data being transferable from a position on said rotatable magnetic drum for processing by the processing means and the processed data being recorded by said recording head in the same position on said rotatable magnetic drum in less than one cycle of said cyclic memory.

9. In a data processor having processing means for processing data represented by signals, apparatus comprising a cyclic memory, said cyclic memory being a first track of a magnetic drum, a first reading head and a first recording head, said cyclic memory having a plurality of positions for storing data, the data in each of said positions being sequentially available for transfer by said reading head once every cycle, delay means having a plurality of positions for storing data, said delay means being a portion of a second track of a magnetic drum, a second reading head and a second recording head, the number of data storage positions of said delay means being less than the number of positions of said cyclic memory, and means for transferring data from said first reading head of said cyclic memory via said processing means to said second recording head of said delay means and thereafter from said second reading head to said first recording means, the data being extracted from a position in said cyclic memory then processed by the processing means and returned to the same position in said cyclic memory in less than one cycle of said cyclic memory.

10. Apparatus for processing data represented by signals comprising a cyclic memory for storing the data as signals, said cyclic memory having a plurality of positions for storing the data, said cyclic memory having an input and an output, a storage means having a plurality of positions for storing data as signals and having an input and an output, said storing means having fewer positions than said cyclic memory, means for synchronizing signals stored in said cyclic memory with signals stored in said storage means, a data processing unit having an input and an output, means for coupling the output of said cyclic memory to the input of said data processing unit, means for coupling the output of said data processing unit to the input of said storage means, and means for coupling the output of said storage means to the input of said cyclic memory such that the data as signals transferred from positions in said cyclic memory to said processing unit is returned to the same positions in less than one cycle of said cyclic memory.

11. Apparatus for continuously processing data represented by signals comprising a first cyclic memory having a plurality of positions for storing the data as signals, said first cyclic memory having an input and an output, a delay means including a portion of a second cyclic memory for storing data as signals, said delay means having an input and an output, means for synchronizing signals stored in said first cyclic memory with signals stored in said second cyclic memory, a data processing unit having an input and an output, means for coupling the output of said first cyclic memory to the input of said data processing unit, means for coupling the output of said data processing unit to the input of said delay means, and means for coupling the output of said delay means to the input of said first cyclic memory such that the data as signals transferred from positions in said first cyclic memory to said processing unit is returned to the same information positions in less than one cycle of said first cyclic memory.

12. Apparatus for processing data represented by signals comprising a processing circuit having an input and an output, a rotatable magnetic drum having first and second tracks for storing data as magnetization patterns at predetermined positions, a recording head and a reproducing head associated with each of said tracks, each of said recording heads being positioned a peripheral distance along the associated track from the associated reproducing head, the reproducing head of said first track being coupled to the input of said processing circuit, the output of said processing circuit being coupled to the recording head of said second track, the reproducing head of said second track being coupled to the recording head of said first track, the peripheral spacing between the reproducing head and recording head associated with said second track being less than the peripheral spacing between the recording head and reproducing head associated with said first track such that the time required for signals to be reproduced from said first track, operated upon by said processing circuit and transferred via said second track to the recording head of said first track is the same as the time required for a position in said first track to rotate from the reproducing head of said first track to the recording head of said first track.

13. Apparatus for processing data represented by signals comprising processing circuit having an input and an output, a rotatable magnetic drum having first and second tracks for storing data as magnetization patterns at predetermined positions, a recording head and reproducing head associated with each of said tracks, each of said recording heads being position a peripheral distance along the associated track from the associated reproducing head, the reproducing head of said first track being coupled to the input of said processing circuit, the output of said processing circuit being coupled to the recording head of said second track, the reproducing head of said second track being coupled to the recording head of said first track, the peripheral spacing between the reproducing head and recording head associated with said second track being less than the peripheral spacing between the recording head and reproducing head associated with said first track such that the time required for signals to be read from said first track, operated upon by said processing circuit and transferred via said second track to the recording head of said first track is the same as the time required for a position in said first track to rotate from the reproducing head of said first track to the recording head of said first track and means for synchronizing the transferred signals with said rotatable magnetic drum.

14. Apparatus for processing data represented by signals, said apparatus comprising a cyclical storage device having a plurality of sequential data positions, sensing means for sensing seriatim the data stored in said data storage positions, data processing means for processing data sensed by said sensing means, recording means displaced from said sensing means a predetermined number of data storage positions in the direction of progression of said data storage positions in said storage device, said predetermined number being substantially less than said plurality, and means connecting said recording means and said data processing means, said connecting means and said data processing means having a combined transitory data storage capacity equal to said predetermined number of data storage positions whereby data sensed from any data storage position may be processed and the processed data recorded into the same data storage position and recorded in less than a cycle of said cyclical storage device.

15. A data processor having processing means for processing data represented by signals, apparatus comprising a cyclic memory having a plurality of positions for storing data, a readout device for detecting the data in each of said positions, said data being sequentially available for tarnsfer once every cycle, a recording device to insert data into said data storing positions, storage means having a plurality of positions for storing data, the number of positions of said storage means being less than the number of positions of said cyclic memory, and means including said readout device, said processing means, said storage means and said recording device for processing data in said cyclic memory, the data being readout from a position in said cyclic memory, then processed by the processing means and the processed data recorded in the same position in said cyclic memory in less than one cycle of said cyclic memory.

16. Apparatus for processing data represented by signals comprising a first cyclic memory having a plurality of positions for storing data, said first cyclic memory having an input and an output, a second cyclic memory for storing data having an input and an output, there being more positions between the input and the output of said first cyclic memory than between the input and the output of said second cyclic memory, means for synchronizing signals stored in said first cyclic memory with signals stored in said second cyclic memory, a processing unit having an input and an output, means for coupling the output of said first cyclic memory to the input of said second cyclic memory, means for coupling the output of said second cyclic memory to the input of said processing unit, and means for coupling the output of said processing unit to the input of said first cyclic memory such that the data as signals transferred from positions in said first cyclic memory to said processing unit via said second cyclic memory is returned to the same information positions in less than one cycle of said first cyclic memory.

17. A magnetic data storage system comprising: a rotatable magnetic drum register having a plurality of tracks; means for rotating said magnetic drum register; a plurality of magnetic recording heads positioned contiguous to certain of said tracks; a plurality of magnetic reading heads positioned contiguous to certain of said tracks; in certain of said tracks, said recording head being displaced from said reading head such that areas of registration on said magnetic drum will pass under a recording head a predetermined time interval after passing under a reading head; a computing means having a plurality of outputs for different delay periods, one of said delay periods of which is equal to said predetermined time interval; first switching means for selectively coupling certain of said magnetic reading heads to said computing means during certain intervals; and second switching means for selectively coupling during certain other intervals outputs from said computer means to certain of said magnetic recording heads.

18. Apparatus for processing data represented by signals comprising a first cyclic memory unit having a plurality of positions for storing data, said first cyclic memory unit having an input and an output, a second cyclic memory unit for storing data having an input and an output, there being more positions between the input and the output of said first cyclic memory unit than between the input and the output of said second cyclic memory unit, means for synchronizing signals stored in said first cyclic memory unit with signals stored in said second cyclic memory unit, a processing unit having an input and an output, means for coupling the output of each of said units to the input of one other of said units to form a serial loop such that the data as signals transferred from positions in said first cyclic memory unit to said processing unit via said second cyclic memory unit may be returned to the same information positions in less than one cycle of said first cyclic memory unit.

References Cited by the Examiner

UNITED STATES PATENTS

| | | | |
|---|---|---|---|
| 2,611,813 | 9/1952 | Sharpless et al. | |
| 2,675,427 | 4/1954 | Newby. | |
| 2,698,427 | 12/1954 | Steele | 235—61 X |
| 2,700,148 | 1/1955 | McGuigan et al. | 235—61 X |
| 2,701,095 | 2/1955 | Stibitz | 235—61 |
| 2,737,342 | 3/1956 | Nelson | 235—173 |
| 2,739,299 | 3/1956 | Burkhart | 235—61 X |
| 2,770,797 | 11/1956 | Hamilton et al. | 235—61 X |
| 2,785,855 | 3/1957 | Williams et al. | 235—61 |
| 2,787,416 | 4/1957 | Hansen | 235—61 |
| 2,815,498 | 12/1957 | Steele | 340—174 |
| 2,866,177 | 12/1958 | Steele | 235—167 X |
| 2,910,238 | 10/1959 | Miles et al. | 235—167 |
| 2,935,734 | 5/1960 | Donan et al. | 235—167 X |

FOREIGN PATENTS

| | | |
|---|---|---|
| 731,140 | 6/1955 | Great Britain. |

MALCOLM A. MORRISON, *Primary Examiner.*

L. M. ANDRUS, LEO SMILOW, IRVING L. SRAGOW, EVERETT R. REYNOLDS, *Examiners.*